United States Patent
Gu et al.

(10) Patent No.: US 6,658,138 B1
(45) Date of Patent: Dec. 2, 2003

(54) PRODUCE TEXTURE DATA COLLECTING APPARATUS AND METHOD

(75) Inventors: Yeming Gu, Suwanee, GA (US); Daniel B. Seevers, Duluth, GA (US)

(73) Assignee: NCR Corporation, Dayton, OH (US)

( * ) Notice: Subject to any disclaimer, the term of this patent is extended or adjusted under 35 U.S.C. 154(b) by 588 days.

(21) Appl. No.: 09/640,025

(22) Filed: Aug. 16, 2000

(51) Int. Cl.$^7$ ................................................. G06K 9/00
(52) U.S. Cl. ........................................ 382/110; 382/108
(58) Field of Search ....................... 382/10, 190, 203, 382/108, 154, 141, 162; 356/403, 237.1; 345/582, 589, 597, 600

(56) References Cited

U.S. PATENT DOCUMENTS

| | | | | |
|---|---|---|---|---|
| 4,461,575 A | * | 7/1984 | Miller et al. ................ 356/639 |
| 4,693,330 A | | 9/1987 | Uchimura et al. ............. 177/25 |
| 4,825,068 A | * | 4/1989 | Suzuki et al. ........... 250/223 R |
| 5,059,027 A | * | 10/1991 | Roesler et al. ............... 356/456 |
| 5,166,755 A | | 11/1992 | Gat ............................. 356/419 |
| 5,204,920 A | * | 4/1993 | Moran et al. ................ 382/166 |
| 5,237,402 A | * | 8/1993 | Deshon et al. .............. 358/520 |
| 5,471,311 A | * | 11/1995 | van den Bergh et al. ... 356/446 |
| 5,546,475 A | | 8/1996 | Bolle et al. .................. 382/190 |
| 5,671,288 A | * | 9/1997 | Wilhelm et al. ............. 382/128 |
| 5,867,265 A | * | 2/1999 | Thomas ........................ 356/328 |
| 5,906,711 A | * | 5/1999 | Barnholtz .................... 162/132 |
| 6,005,965 A | * | 12/1999 | Tsuda et al. ................. 382/145 |
| 6,057,850 A | * | 5/2000 | Kichury ....................... 345/584 |
| 6,069,696 A | * | 5/2000 | McQueen et al. ........... 356/326 |
| 6,115,482 A | * | 9/2000 | Sears et al. .................. 382/114 |
| 6,155,489 A | * | 12/2000 | Collins et al. ........... 235/462.01 |
| 6,281,904 B1 | * | 8/2001 | Reinhardt et al. ........... 345/582 |
| 6,356,653 B2 | * | 3/2002 | Brigante et al. ............. 382/145 |
| 6,431,446 B1 | * | 8/2002 | Gu et al. ..................... 235/454 |

FOREIGN PATENT DOCUMENTS

WO     WO 97/08523    * 3/1997

* cited by examiner

*Primary Examiner*—Daniel G. Mariam
*Assistant Examiner*—Shefali Patel
(74) *Attorney, Agent, or Firm*—Paul W. Martin

(57) ABSTRACT

A produce texture data collecting apparatus and method which illuminates a produce item from different directions. The apparatus includes a first light for illuminating a produce item from a first direction, a second light for illuminating the produce item from a second direction, an image capture device for capturing an image of the produce item while the produce item is being illuminated by the first and second lights.

5 Claims, 4 Drawing Sheets

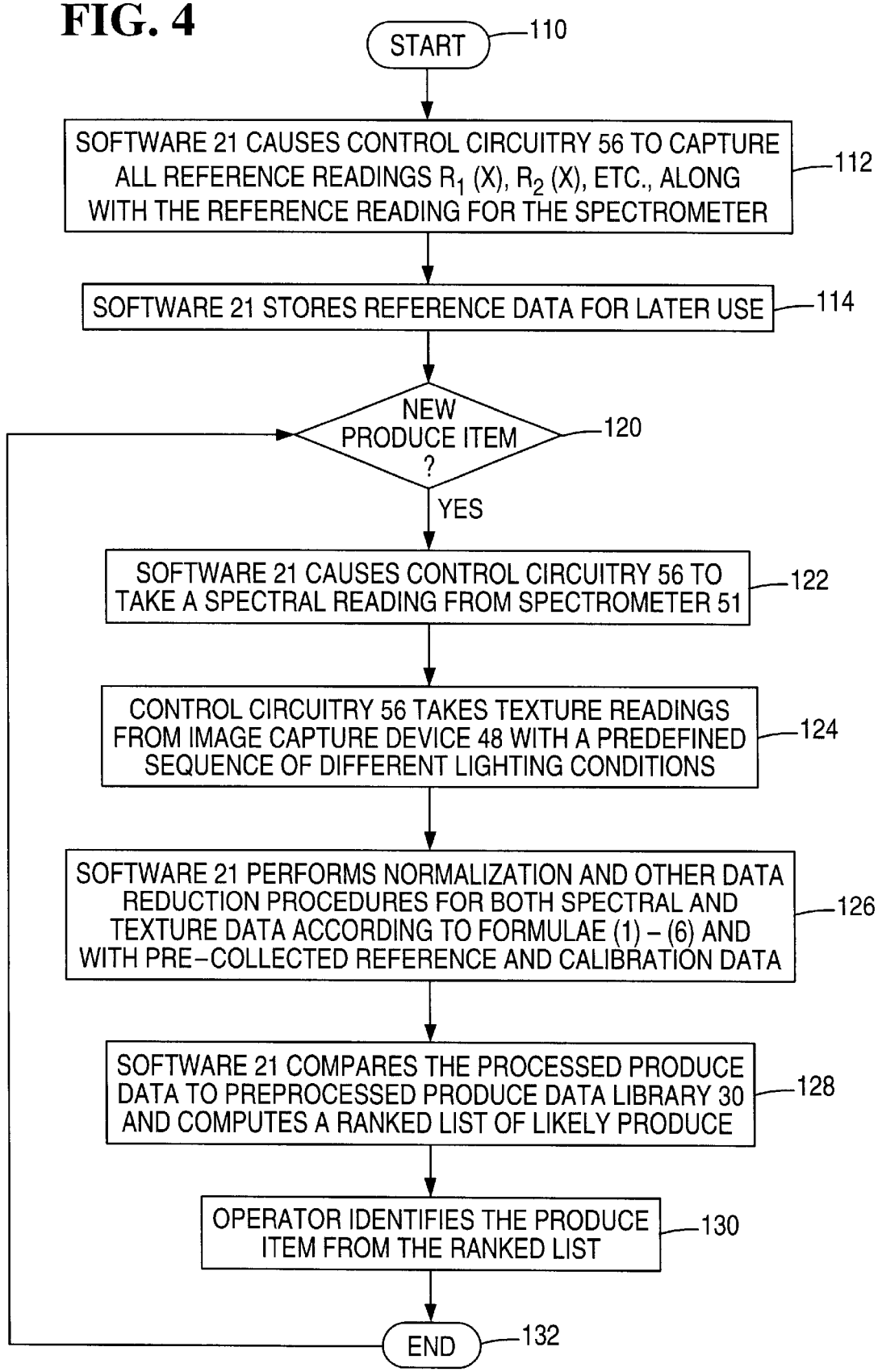

PRODUCE TEXTURE DATA COLLECTING APPARATUS AND METHOD

CROSS-REFERENCE TO RELATED APPLICATIONS

The present invention is related to the following commonly assigned and co-pending U.S. application:

"An Item Checkout Device Including A Bar Code Data Collector And A Produce Data Collector", filed Nov. 10, 1998, invented by Collins, and having a Ser. No. 09/198, 781; U.S. Pat. No. 6,166,110.

BACKGROUND OF THE INVENTION

The present invention relates to product checkout devices and more specifically to a produce texture data collecting apparatus and method.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce data collector disclosed in the co-pending application includes a spectrometer. The spectrometer preferably includes a linear variable filter (LVF) and a linear diode array (LDA), which capture spectral information about a produce item.

Additional information is highly desirable for improving the accuracy of recognition and classification of a number of items. One such type of information is texture information.

There are two kinds of texture information that are relevant to identification, spatial texture and color texture. Spatial texture includes surface roughness caused by small-scale ridges and valleys, peaks and dips, leaflets, etc. Spatial texture also includes the apparent texture of a collection of items. For example, spatial texture includes the collective surface roughness of a bag of beans or a bunch of green onions.

Color texture includes small-scale color variation over the surface of the item. For example, color texture includes color stripes and spots over the surface of an apple. Color texture also includes brightness variation.

Therefore, it would be desirable to provide a produce texture data collecting apparatus and method which is able to collect texture information in order to assist in determining the identity of a produce item.

SUMMARY OF THE INVENTION

In accordance with the teachings of the present invention, to a produce texture data collecting apparatus and method is provided.

The apparatus includes a first light for illuminating a produce item from a first direction during a first time, a second light for illuminating the produce item from a second direction different from the first direction during a second time different from the first time, and an image capture device for capturing a first image of the produce item during the first time and a second image during the second time.

The light reflected from the produce item may also be directed through a spectrometer to obtain spectral data to assist with recognition.

A method of collecting texture data associated with a produce item includes the steps of illuminating the produce item with first and second lights from different directions during different times, capturing a first and second images of the produce item during the different times while the produce item is being illuminated by the first and second lights, and determining texture information from the first and second images of the produce item.

It is accordingly an object of the present invention to provide a produce texture data collecting apparatus and method.

It is another object of the present invention to provide a produce texture data collecting apparatus and method which supplement spectral data collection.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the method of the present invention.

DETAILED DESCRIPTION OF THE PREFERRED EMBODIMENT

Figure 1:
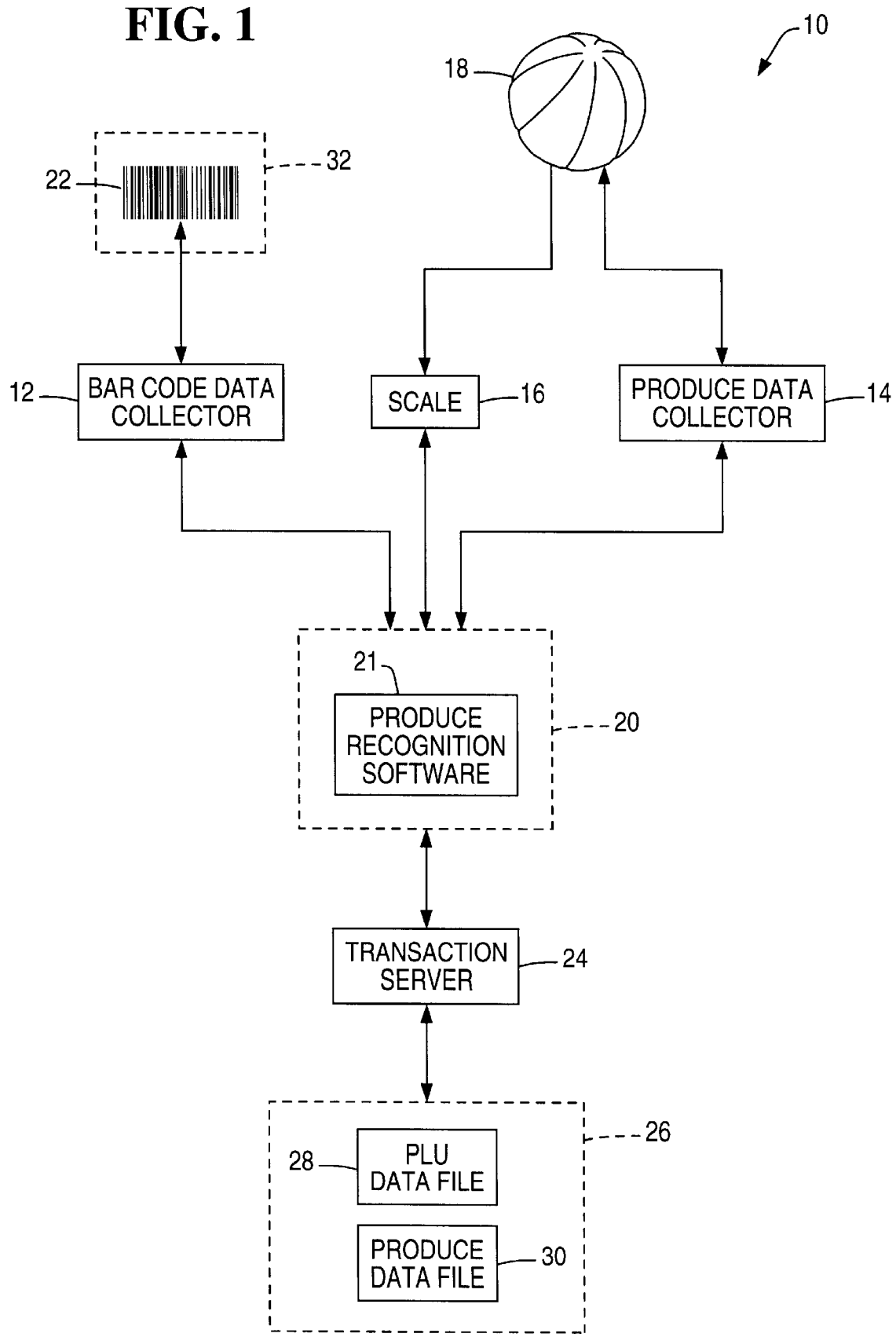
FIG. 1 is a block diagram of a transaction processing system including the produce data collector of the present invention.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data preferably includes spectrum and texture data. Reference produce data is collected and stored within produce data file 30. During a transaction, operation of produce data collector 14 may be initiated automatically or manually.

Scale 16 determines a weight for produce item 18. Scale 16 works in connection with bar code data collector 12, but may be designed to operate and be mounted separately, such as at a produce identification and weigh station. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics from produce data collector 14, identifies produce item 18 by comparing produce data in produce data file 30 with collected produce data, and retrieves an item identification number from produce data file 30. Transaction terminal 20 obtains a corresponding price from PLU data file 28 following identification.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20.

PLU data file 28 and produce data file 30 are stored within storage medium 26, but either may also be located instead at transaction terminal 20, or bar code data collector 12.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Figure 2:
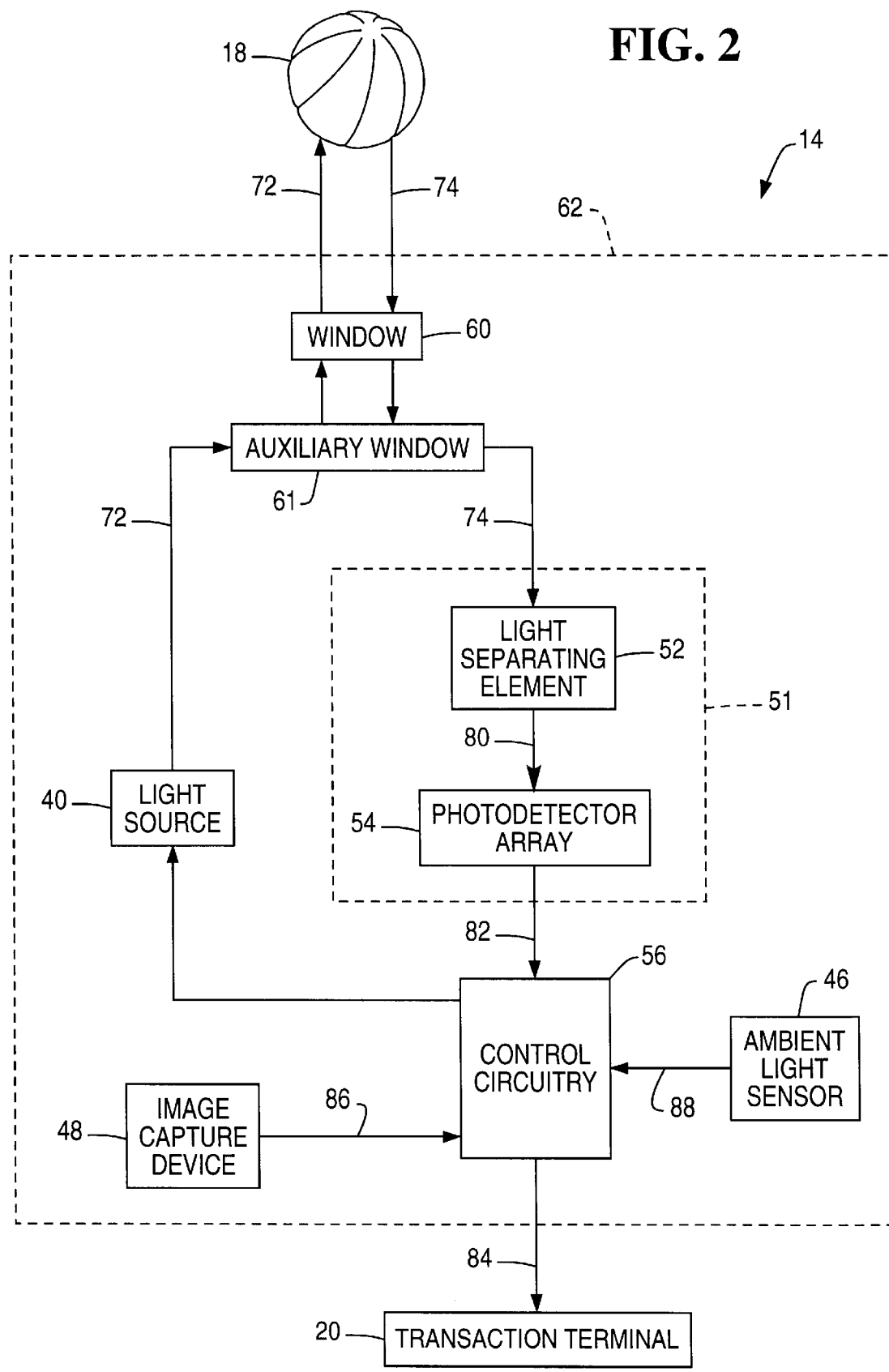
FIG. 2 is a block diagram of the produce data collector.

Turning now to FIG. 2, produce data collector 14 primarily includes light source 40, ambient light sensor 46, spectrometer 51, control circuitry 56, transparent window 60, auxiliary transparent window 61, and housing 62.

Light source 40 produces light 72. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Use of multiple light sources 40 facilitates texture measurement, separation of spatial texture from color texture, and capture of enhanced texture data.

Ambient light sensor 46 senses the level of ambient light through windows 60 and 61 and sends ambient light level signals 88 to control circuitry 56. Ambient light sensor 46 may be used to initiate operation of produce data collector 14.

Image capture device 48 captures image data from produce item 18 and provides data signals 86 to control circuitry 56. Image capture device 48 preferably includes one or more cameras, such as pinhole cameras. The simplest implementation is to use pinhole cameras with one-dimensional detector arrays, similar to the photodetector array 54 used in the spectrometer unit 51. Such one-dimensional cameras take one-dimensional sub-samples of the images of illuminated areas of produce item 18. While a one-dimensional camera does not catch as much information as a normal two-dimensional camera, it greatly simplifies the data reduction process. There is another significant advantage in using similar one-dimensional arrays in both spectrometer 51 and the image capture device 48: they can be easily integrated into the same electronic circuitry.

Spectrometer 51 includes light separating element 52, photodetector array 54.

Light separating element 52 splits light 74 in the preferred embodiment into light 80 of a continuous band of wavelengths. Light separating element 52 is preferably a linear variable filter (LVF), such as the one manufactured Optical Coating Laboratory, Inc., or may be any other functionally equivalent component, such as a prism or a grating.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a CCD array.

Control circuitry 56 controls operation of produce data collector 14 and produces digitized produce data waveform signals 84. For this purpose, control circuitry 56 includes an analog-to-digital (A/D) converter. A twelve bit A/D converter with a sampling rate of 22–44 kHz produces acceptable results.

Control circuitry 56 also receives signals from ambient light sensor 46 in order to initiate operation. In response to ambient light level signals 88, control circuitry 56 waits for ambient light levels to fall to a minimum level (dark state) before turning on light source 40. Ambient light levels fall to a minimum level when produce item 18 covers window 60. After control circuitry 56 has received waveform signals 82 containing produce data, control circuitry 56 turns off light source 40 and waits for ambient light levels to increase before returning to waiting for the dark state. Ambient light levels increase after produce item 18 is removed from window 60.

Housing 62 contains light source 40, ambient light sensor 46, light separating element 52, photodetector array 54, control circuitry 56, and auxiliary transparent window 61. Housing 62 additionally contains transparent window 60 when produce data collector 14 is a self-contained unit. When produce data collector 14 is mounted within the housing of a combination bar code reader and scale, window 60 may be located in a scale weigh plate instead.

Transparent window 60 is mounted above auxiliary transparent window 61. Windows 60 and 61 include an anti-reflective surface coating to prevent light 72 reflected from windows 60 and 61 from contaminating reflected light 74.

In operation, an operator places produce item 18 on window 60. Control circuitry 56 turns on light source 40. Light separating element 52 separates reflected light 74 into different wavelengths to produce light 80 of a continuous band of wavelengths. Photodetector array 54 produces waveform signals 82 containing produce data. Image capture device 48 produces texture information signals. Control circuitry 56 produces digitized produce data signals 84 which it sends to transaction terminal 20. Control circuitry 56 turns off light source 40.

Operation of produce data collector 14 may be automatic, either in response to a signal from scale 16 or ambient light sensor 46. Operation may also be initiated by a signal from transaction terminal 20, either in response to a signal from scale 16 or an input device such as a keyboard.

Transaction terminal 20 uses produce data in digitized produce data signals 84 to classify produce item 18. Here, produce data consists of digitized waveforms and texture data. Transaction terminal 20 compares the produce data to a library of preprocessed produce data stored within produce data file 30. Operator input is required to identify the produce item from a list of likely identifications when a unique identification is not possible from the collected produce data alone.

After identification, transaction terminal 20 obtains a unit price from PLU data file 28 and a weight from scale 16 in order to calculate a total cost of produce item 18. Transaction terminal 20 enters the total cost into the transaction.

Figure 3:
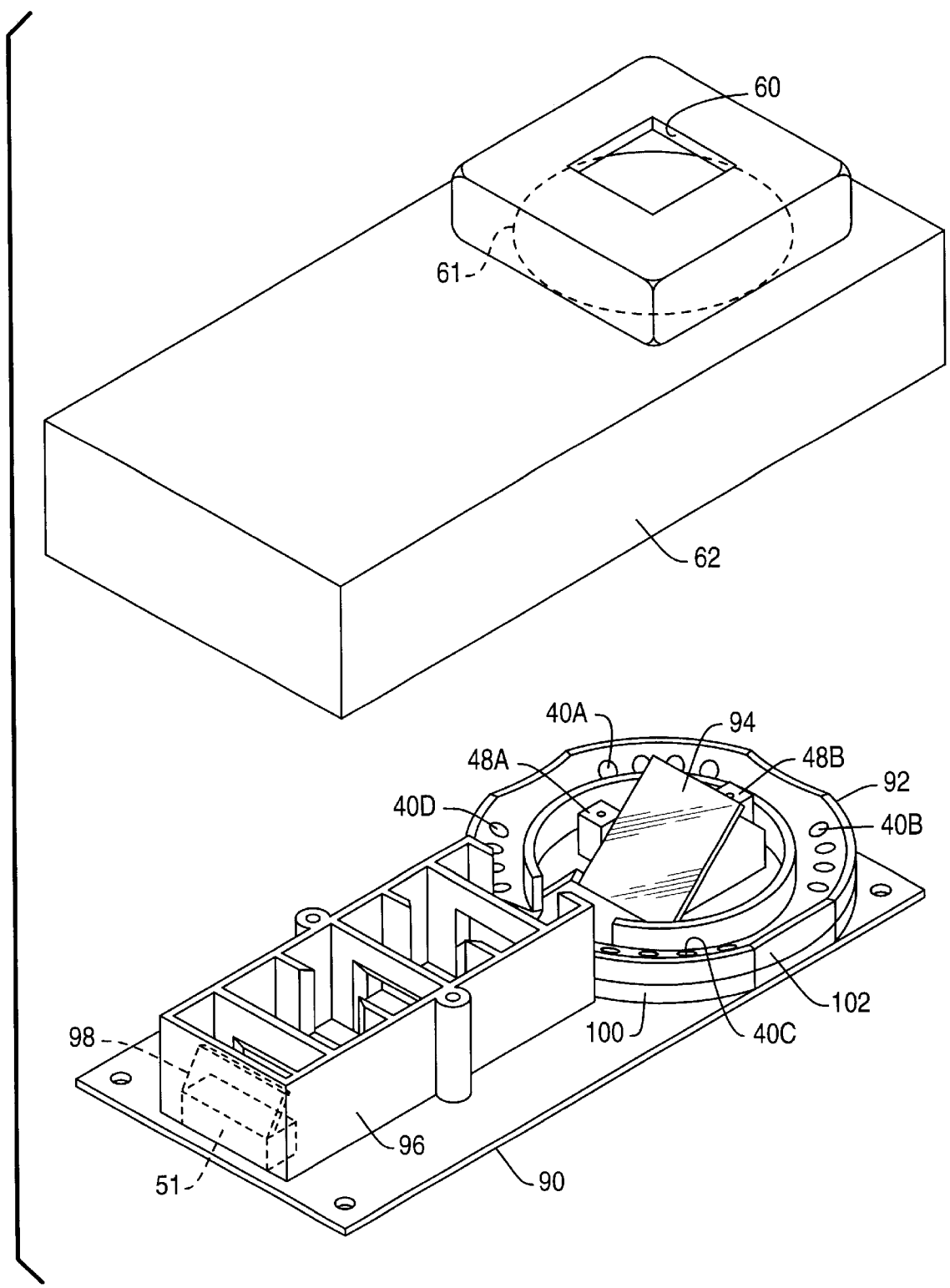
FIG. 3 is a perspective view of the produce data collector.

Turning now to FIG. 3, produce data collector 14 is illustrated in more detail.

Produce data collector 14 additionally includes printed circuit board 90, light source assembly 92, turning mirror 94, stray light baffle 96, and turning mirror 98.

Printed circuit board 90 contains control circuitry 56 and forms a base for ambient light sensor 46, image capture device 48, spectrometer 51, light source assembly 92, turning mirror 94, stray light baffle 96, and turning mirror 98. Printed circuit board 90 fastens to housing 62.

Light source assembly 92 includes light source 40, lower light source mount 100, and upper light source mount 102.

Light source 40 preferably includes a number of white LEDs which are arranged close to window 60 and in direct line of sight of window 60. Light source mount 92 is designed such that each individual LED is pointed at the top surface of window 60 so that there is uniform luminosity over the entire top surface of window 60 for illuminating produce item 18. In the preferred embodiment, the LEDs are all aimed at the center of window 60 and oriented at an angle of about 31.75 degrees. The LEDs are located at a distance of about 1.657 inches from the center of window 60, and 1.075 inches from the center of light source assembly 92. The optimal arrangement depends on the directivity of the LEDs and the size of the window.

The preferred embodiment provides uniformity in both spectrum and luminosity. Since it is highly desirable to avoid using complicated optical devices, such as lens systems and light pipes, for simplicity, the preferred embodiment envisions arrangements of multiple LEDs. The LEDs are spectrally matched in groups, and their placement and orientation achieves optimal uniformity in both spectrum and luminosity across the illuminated surface area.

To achieve uniformity in both spectrum and luminosity with multiple LEDs, the LED samples are first sorted into spectrally matched groups by computing and analyzing the matrices of linear correlation coefficients. The direct illumination from LEDs in a matched group will have a uniform spectrum regardless of their positions and beam orientations.

Second, LED positions and beam orientations are arranged to achieve uniform luminosity. If higher luminosity is needed to achieve adequate signal level, multiple groups can be used. The total illumination from multiple groups will be uniform in both spectrum and luminosity even if the spectra from different groups are different.

The illustrated embodiment includes sixteen white LEDs arranged in four groups 40A, 40B, 40C, and 40D of four LEDs on four sides of lower light source mount 100. Other arrangements are also envisioned by the present invention, such as two or four groups of four and eight LEDS. To achieve higher system efficiency, LEDs with a narrow, concentrated beam are preferred.

The present invention uses multiple light sources 40 to create directional illumination of produce item 18 from at least two different directions. For example, light sources 40A and 40C illuminate window 61 from first and second directions and from opposite sides of window 61. Light sources 40B and 40D illuminate window 61 from third and fourth directions and from opposite sides of window 61. Light sources 40A, 40B, 40C, and 40D are also individually controlled by control circuitry 56. Obviously, neighboring LEDs may be combined together to enhance the directional illumination.

Lower light source mount 100 is generally circular in shape. This arrangement supports the LEDs in the preferred arrangement and orientation. Lower light source mount 100 connects mechanically and electrically to printed circuit board 90.

Upper light source mount 102 is also generally circular in shape and connects mechanically in mating relationship to lower light source mount 100. Upper light source mount 102 mechanically holds the LEDs in a preferred orientation for even illumination across the area of window 60.

Turning mirror 94 routes reflected light 74 from produce item 18 through stray light baffle 96 towards turning mirror 98. Deflector mirror 94 is mounted at about a forty-five degree.

Two image-capture devices 48A and 48B are mounted adjacent turning mirror 94. Image capture devices 48A and 48B are oriented so as to capture images in orthogonal directions. Image capture device 48A is oriented to capture an image substantially in line with groups 40A and 40C. Image capture device 48B is oriented to capture an image substantially in line with groups 40B and 40D.

Turning mirror 98 directs reflected light 74 to spectrometer 51. Turning mirror 98 is mounted at about a forty-five degree angle.

Turning now to FIG. 4, produce recognition method of the present invention is illustrated in detail beginning with START 110.

In steps 112–114, produce recognition software 21 collects reference data. Reference readings are captured for use in normalizing data. Normally, steps 112 to 114 are performed during the initial system setup and calibration process. New reference readings may be needed when the system is changed, for example, following a re-calibration of produce data collector 14.

In step 112, produce recognition software 21 causes control circuitry 56 to capture reference data readings $R_1(x)$ and $R_2(x)$ from a flat and smooth white reference placed over window 61 using at least two lights of light source 40.

Reference data readings $R_1(x)$ and $R_2(x)$ will be taken using groups 40A and 40C, and groups 40B and 40D. The reference readings will be taken with image capture devices 48A and 48B.

Reference data $R_1(x)$ is captured with light source 40A turned on and light source 40C turned off. Reference data $R_2(x)$ is captured with light source 40A turned off and light source 40C turned on. Similarly, reference data in another dimension are taken with image capture device 48B and light source 40B and 40D.

In step 114, produce recognition software 21 stores reference data readings $R_1(x)$ and $R_2(x)$ for later use.

In step 120, the system constantly monitors window 60. When the system detects a new produce item on window 60, it goes through steps 122–132.

In step 122, produce recognition software 21 causes control circuitry 56 to take a spectral reading from spectrometer 51.

In step 124, produce recognition software 21 causes image capture device 48A to capture two different sets of image data under different lighting conditions. First image data $I_1(x)$ is captured with light sources 40A turned on and light sources 40C turned off. Second image data $I_2(x)$ is captured with light sources 40A turned off and light sources 40C turned on. Similarly it takes two readings in a different dimension with image capture device 48B.

Angled illumination creates bright areas and shadows off peaks and valleys on the surface of produce item 18, but dark colored areas produce a similar affect regardless of which light sources are turned on.

In step 126, produce recognition software 21 normalizes image data $I_1(x)$ and $I_2(x)$ using reference readings $R_1(x)$ and $R_2(x)$, assuming that the corresponding detector dark levels have been properly subtracted from all these readings, $$I'_1(x) = \frac{I_1(x)}{R_1(x)} \text{ and } I'_2(x) = \frac{I_2(x)}{R_2(x)}, \tag{1}$$

The difference between the two normalized image data $I'_2(x)$ and $I'_1(x)$ determines the spatial texture due to the presence of peaks and valleys:

$$T_s(x) = I'_1(x) - I'_2(x), \tag{2}$$

The sum of the normalized image data $I_2(x)$ and $I_1(x)$ determines color texture due to the presence of color variations:

$$T_c(x) = I'_1(x) + I'_2(x), \tag{3}$$

There are many different ways to extract texture parameters from $T_s(x)$ and $T_c(x)$. When using pinhole camera with one-dimensional detector arrays, the data reduction can be much simplified. For example, the simple root-mean-square deviation from the mean of $T_s(x)$ will give a good "roughness" measure, i.e., $$P_{s,Roughness} = \sqrt{\sum_i (T_s(x_i) - \overline{T}_s)^2 / n}, i = 1, \ldots, n, \tag{4}$$

Where $\overline{T}_s$ is the average of $\{T_s(x_i), i=1, \ldots, n\}$; n is the total number of discrete points in the spatial dimension x. A similar measure can also be used for the color texture, $$P_{c,Roughness} = \sqrt{\sum_i (T_c(x_i) - \overline{T}_s)^2 / n}, \tag{5}$$

Another good texture measure (independent of $P_{Roughness}$) is the typical scale of the texture, which can be estimated by $$S_s = \frac{1}{n} \sum_i \left(\frac{dT_s(x_i)}{dx}\right)^{-1}, S_c = \frac{1}{n} \sum_i \left(\frac{dT_c(x_i)}{dx}\right)^{-1}, \tag{6}$$

The similar texture readings from a different dimension, $I_1(y)$ and $I_2(Y)$, are similarly processed, i.e., for each parameter derived in equations (4) to (6), there is a corresponding parameter computed from texture data in y-dimension. And the resulted texture measurements are paired in the two dimensions to give a simplified measure of the actual two-dimensional texture.

More sophisticated texture parameters can be computed if the image capture devices are regular 2-D cameras. There are literatures available in the public domain on advanced algorithms for texture modeling. For example, the Extended Self-Similar Model for natural texture patterns (Kaplan and Kuo, *IEEE Transactions on Pattern Analysis and Machine Intelligence*, Vol. 17, No. 11, November, 1995, p.1043).

In step 128, produce recognition software 21 compares the spectral data, along with texture parameters, to precollected produce data in library 30 and compute a ranked list of most likely candidates for the unknown produce item.

In step 130, the operator identifies the produce item from the listed candidates and completes the transaction for the item.

In step 132, the method ends and the system returns to the monitoring mode waiting for the next produce item.

Produce recognition software 21 either automatically selects the candidate with the highest probability or displays the list and records an operator choice from the list.

Although the invention has been described with particular reference to certain preferred embodiments thereof, variations and modifications of the present invention can be effected within the spirit and scope of the following claims. For example, different combinations of the individual light sources may be used for the directional illumination to achieve the optimal signal level. Also, the image capture device may consist of either one-dimensional cameras or two-dimensional cameras. While pinhole cameras provides the simplest optical arrangement, more sophisticated camera system may be used for better image quality and higher signal level. Finally, the apparatus and method may be applied to other objects besides produce items.

We claim:

1. A method of collecting texture data associated with a produce item comprising the steps of:
   illuminating the produce item with a first light from a first direction during a first time;
   capturing a first image of the produce item;
   illuminating the produce item with a second light from a second direction different from the first direction during a second time different from the first time;
   capturing a second image of the produce item;
   determining the difference between first image data from the first image and second image data from the second image to produce spatial texture information; and
   determining the sum of the first image data and the second image data to produce color texture information.

2. A method of collecting texture data associated with a produce item comprising the steps of:
   illuminating the produce item with a first light from a first direction during a first time;
   capturing a first image of the produce item;
   illuminating the produce item with a second light from a second direction different from the first direction during a second time different from the first time;

capturing a second image of the produce item;

normalizing first image data from the first image and second image data from the second image with first and second calibration readings;

determining the difference between first normalized image data and second normalized image data to produce spatial texture information; and determining the sum of the first image data and the second image data to produce color texture information.

3. A produce recognition method comprising the steps of:

illuminating the produce item with a first light from a first direction during a first time;

capturing a first image of the produce item;

illuminating the produce item with a second light from a second direction different from the first direction during a second time different from the first time;

capturing a second image of the produce item;

determining the difference between first image data from the first image and second image data from the second image to produce spatial texture information;

determining the sum of the first image data and the second image data to produce color texture information; and comparing the spatial texture information and the color texture information with reference spatial texture information and reference color texture information to identify the produce item.

4. A produce recognition method comprising the steps of:

illuminating the produce item with a first light from a first direction during a first time;

capturing a first image of the produce item;

illuminating the produce item with a second light from a second direction different from the first direction during a second time different from the first time;

capturing a second image of the produce item;

producing spectral data from light reflected from the produce item;

determining the difference between first image data from the first image and second image data from the second image to produce spatial texture information;

determining the sum of the first image data and the second image data to produce color texture information;

comparing the spectral data with reference spectral data to produce first identification results;

comparing the spatial texture information with reference spatial texture information to produce second identification results;

comparing the color texture information with reference color texture information to produce third identification results; and combining the first, second, and third identification results to produce a number of fourth identification results.

5. The method as recited in claim 4, further comprising the steps of:

displaying the fourth identification results; and recording an operator selection of a single choice from the fourth identification results.

* * * * *